Jan. 10, 1950     F. I. STEELE ET AL     2,494,368
ARRANGEMENT OF AIRCRAFT PROPULSION
AND RADIO VIEWING COMPONENTS
Filed April 30, 1947
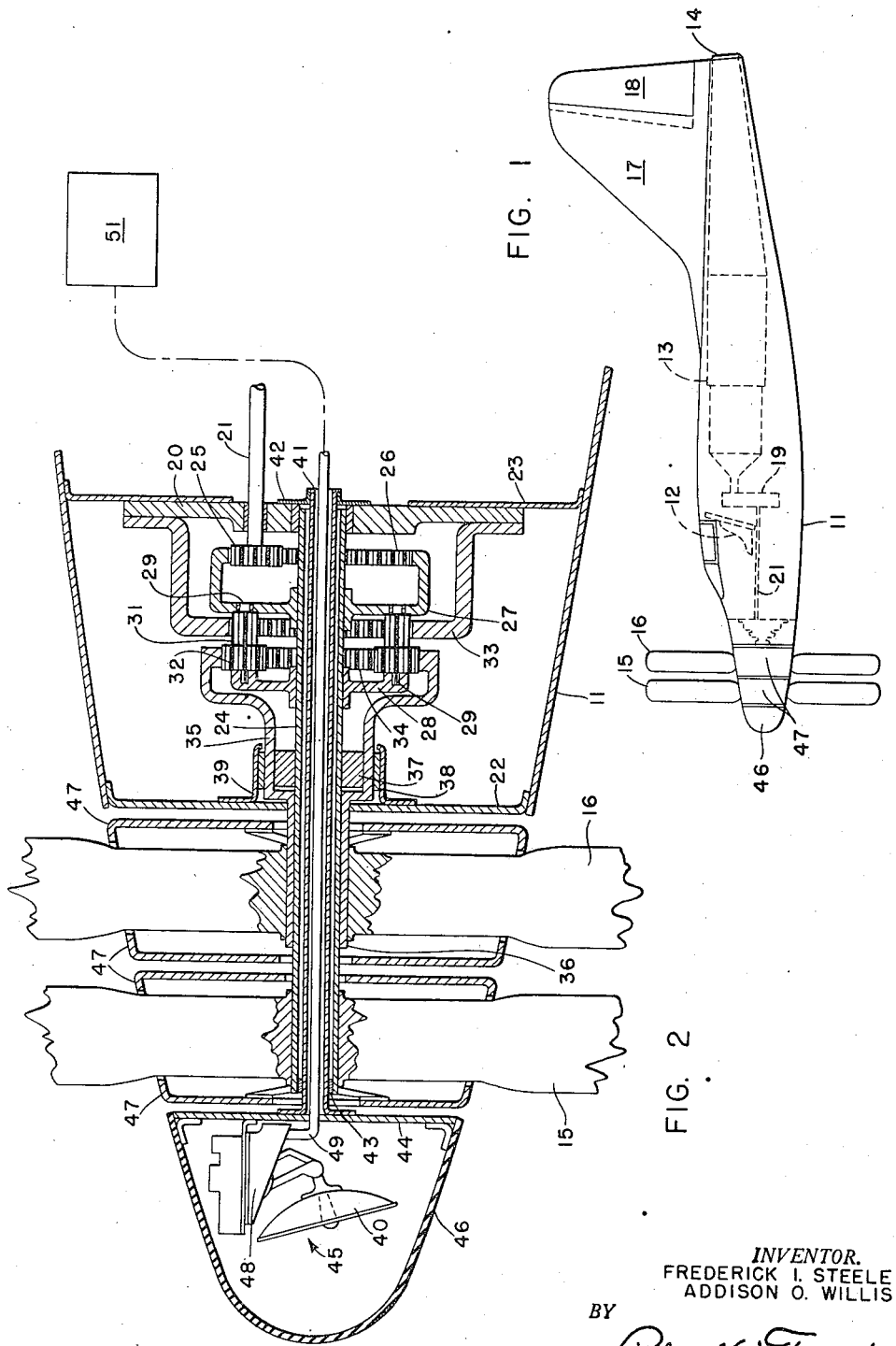
INVENTOR.
FREDERICK I. STEELE
ADDISON O. WILLIS
BY
*Richard W. Treverton*
ATTORNEY

Patented Jan. 10, 1950

2,494,368

UNITED STATES PATENT OFFICE 2,494,368

ARRANGEMENT OF AIRCRAFT PROPULSION AND RADIO VIEWING COMPONENTS

Frederick I. Steele and Addison O. Willis, Columbus, Ohio, assignors to Curtiss-Wright Corporation, a corporation of Delaware Application April 30, 1947, Serial No. 744,874

5 Claims. (Cl. 244—1)

The present invention relates to an aircraft driven by one or more rotating propellers and provided with radar or similar equipment.

Radio direction and ranging equipment, normally referred to as radar, and similar equipment usually includes an antenna which for maximum effectiveness should have an unobstructed frontal view over a region that is large in both azimuth and elevation. In certain types of aircraft where such radio-viewing equipment is desirable, as for example fighter airplanes propelled by one or more turbine driven propellers and by the exhaust gas jet from the turbines, it is desirable to dispose the propellers at the nose of the airplane fuselage. The present invention provides an arrangement of aircraft propulsion and radio viewing components wherein the antenna is disposed directly ahead of the propellers. By this arrangement the view from the antenna is entirely unobstructed forwardly, laterally in both directions and vertically in both directions. The arrangement also disposes the antenna substantially in alignment with the longitudinal axis of the aircraft. This is advantageous in cases where the radar, or similar radio viewing equipment, is employed to direct or aid in the direction of gunfire, bombs or the like from the aircraft, and also in cases where the equipment is employed for controlling or aiding in the control of the flight path of the aircraft itself.

The foregoing and other objects and advantages of the invention will become apparent from the following description of the arrangement shown in the accompanying drawings, wherein:

Figure 1 is a side elevation of an aircraft structure; and

Figure 2 is a fragmentary vertical longitudinal sectional view, illustrating on a larger scale the forward portion of the aircraft of Figure 1.

As shown the aircraft may comprise a body or fuselage 11 including a pilot's compartment with seat 12 and having a gas turbine type engine 13 disposed rearwardly of the pilot's compartment. The turbine engine drives counter-rotating propellers 15 and 16 that are disposed at the nose of the fuselage, and further propels the aircraft by exhausting combustion gases through a rearwardly directed tailpipe 14. The aircraft includes a vertical tail plane including a vertical fin 17 and rudder 18, as shown, and also includes a main wing and horizontal tail plane which are not shown since they are unnecessary to a full understanding of the invention.

The turbine engine 13, through reduction gearing contained in a gear box 19, drives a propeller shaft 21 that extends into a gear case comprising spaced bulkheads 22 and 23 at the forward end of fuselage 11. A part 20 rigidly secured to bulkhead 23 has bearings for journalling the shaft 21 and the aft end of a tubular propeller shaft 24 upon which the forward propeller, 15, is mounted. Mounted on shaft 21 within the gear case is a drive gear 25 meshing with internal gear teeth 26 of a gear element 27 that is keyed to the shaft 24. Also keyed to the latter shaft in forwardly spaced relation to gear 27 is a member 28.

Extending between and journalled in gear 27 and member 28 are a plurality of stub shafts 29 to each of which a pinion 31 and a pinion 32 are keyed. The pinions 31 mesh with internal teeth on a ring gear 33 which is rigidly secured to the gear case. The pinions 32 mesh with internal gear teeth 34 on a tubular structure 35 whose forward end comprises a tubular propeller shaft 36. The latter is disposed in telescoped bearing relation upon the tubular propeller shaft 24 and carries the rear propeller, 16. For supporting the shaft 24 at a point well forward of part 20 the shaft is journalled in a bearing 37 which is secured within the tubular structure 35. The outer surface of the latter, adjacent the bearing 37, is journalled in a bearing 38 which is mounted on bulkhead 22 by a fitting 39.

It will be seen that rotation of shaft 21 in a clockwise direction will, through gearing 25, 26, cause rotation of shaft 24 and propeller 15 in the same direction but at a slower R. P. M. As gear member 27 rotates, the pinion assemblies 31, 32 will be caused to rotate about their axes by engagement of pinions 31 with stationary ring gear 33. In the arrangement shown this will result in rotation of gear teeth 34, shaft 36 and propeller 16 in a counterclockwise direction, because the ratio of pinion 32 to gear 34 is larger than the ratio of pinion 31 to gear 33. Preferably the gear ratio of 32 to 34 is exactly twice that of the gear ratio of 31 to 33 so that the propellers 15 and 16 will be driven at equal speeds relative to the airplane but in opposite directions.

Extending forwardly from the fuselage or body 11 through the tubular propeller shaft 24 is a support member 41, preferably tubular, having a channel extending longitudinally therethrough. The support member is supported against rotation and axial motion by a fitting 42 connected to part 20, and to prevent transverse movement of its forward end due to flexing caused by vibrations or rapid accelerations of the airplane, a bearing 43 may be provided between member 41 and propeller shaft 24. A plate 44 secured to the forward end of member 41 mounts an antenna unit 45 and a dome 46 housing the latter.

The details of the antenna unit 45, sometimes referred to as a scanner, form no part of the present invention. The unit shown comprises a parabaloid reflector bowl 40 and casing body 48, the latter being attached to plate 44 and provided with means for supporting the bowl. Suitable means may be associated with the casing 48 for moving the reflector bowl angularly as required for directing a radar beam with the desired scanning motion. A tube 49, for conducting the radar waves between the antenna unit 45 and a transmitter-receiver unit 51 in the body of the aircraft, extends through the longitudinal channel within the support member 41.

The member 46, usually referred to as a radome, is formed of suitable plastic or resinous material for passing the radiation from the unit 45 with a minimum of reflection or other disturbance. The radome is arranged as nearly as practicable in symmetrical relation with the axis of propeller shaft 24, and, together with the outer surface of fairing elements 47 which extend around the hubs of propellers 15 and 16, constitutes a streamlined forward continuation from the aircraft body 11.

It will be seen that, with the arrangement of aircraft, aircraft propulsion and radio viewing components herein described, the antenna is disposed forwardly of the rotating propeller means and therefore has an unobstructed view forwardly and transversely of the aircraft, and also that the antenna is disposed substantially in alignment with the aircraft's longitudinal axis. At the same time the advantages of a propulsion system including forwardly disposed or tractor-type propellers and a tail jet exhaust are realized.

It will be understood that the conductor 49, hereinbefore described as a wave conducting tube extending between the antenna 45 and transmitter-receiver unit 51, may be modified to comprise or include any suitable mechanical, hydraulic, electrical or electronic conducting means for operating the antenna or related apparatus within the radome and for transmitting intelligence between the units 45 and 51. Similarly, the power plant 13, 14, which preferably comprises a gas turbine with jet exhaust, may be replaced with a power plant of another type.

It will be understood further that the propeller or propellers may be of any suitable fixed pitch or variable pitch type, the details of the proellers not being illustrated for the reason that such details are not essential to an understanding of the present invention. The foregoing and other modifications and changes will occur to persons skilled in this art and may be made without departing from the spirit of our invention or from the scope of the appended claims.

We claim:

1. A propeller driven aircraft having radio direction and ranging equipment, comprising an aircraft body within which said equipment is mounted, a support member having a channel therethrough, said member extending forwardly from said body, a scanner for said equipment supported upon the forward end of said support member, a wave conducting tube connecting the scanner with said equipment within said body, said wave conducting tube extending through the channel of said support member, a radome housing said scanner, said radome being supported by said support member in generally symmetrical relation to the longitudinal axis of the support member, a pair of coaxial tubular propeller shafts extending around the support member, a propeller mounted on each of said shafts, means on the aircraft body journaling said shafts for independent rotation, a power plant in said body, and gearing between said power plant and said shafts for rotating the latter in opposite directions.

2. A propeller driven aircraft having radio viewing equipment, comprising an aircraft body within which said equipment is mounted, a support member having a channel therethrough, said member extending forwardly from said body, a scanner for said equipment supported upon the forward end of said support member, a wave conducting tube connecting the scanner with said equipment within said body, said wave conducting tube extending through the channel of said support member, a radome housing said scanner, said radome being supported by said support member in generally symmetrical relation to the longitudinal axis of the support member, tubular propeller shaft extending around the support member, a propeller mounted on said shaft, means on the aircraft body journalling said shafts for rotation, a power plant in said body, and gearing between said power plant and said shaft for rotating the latter.

3. A propeller driven aircraft having radio viewing equipment, comprising an aircraft body within which said equipment is mounted, a tubular support member, said tubular support member extending forwardly from said body, a scanner for said equipment supported upon the forward end of said tubular support member, a wave conducting tube connecting the scanner with said equipment within said body, said wave conducting tube extending through the said tubular support member, a radome housing said scanner, said radome being supported by said tubular support member in generally symmetrical relation to the longitudinal axis of the latter, a tubular propeller shaft extending around the tubular supoprt member, a propeller mounted on said shaft, means on the aircraft body journalling said shaft for rotation, a power plant in said body, and gearing between said power plant and said shaft for rotating the latter.

4. A propeller driven aircraft having radio viewing equipment, comprising an aircraft body within which said equipment is mounted, a support member having a channel therethrough, said support member extending forwardly from said body, a scanner for said equipment supported upon the forward end of said support member, a wave conducting tube connecting the scanner with said equipment within said body, said wave conducting tube extending through the channel of said support member, a tubular propeller shaft extending around the support member, a propeller member mounted on said shaft, means on the aircraft body journalling said shafts for rotation, a power plant in said body, gearing between said power plant and said shafts for rotating the latter, and a radome housing said scanner, said radome being supported by one of said members in generally symmetrical relation to the longitudinal axis of said shaft.

5. A propeller driven aircraft having radio viewing equipment, comprising an aircraft body within which said equipment is mounted, a support member having a channel therethrough, said support member extending forwardly from said body, an antenna unit for said equipment supported upon the forward end of said support member, conductor means extending through the channel of said support member for conducting intelligence between said antenna unit and said equipment within the aircraft body, a tubular propeller shaft extending around the support member, a propeller member mounted upon said shaft, means on the aircraft body journalling said shafts for rotation, a power plant in said body, gearing between said power plant and said shafts for rotating the latter, and a radome housing said antenna unit, said radome being supported by one of said members.

FREDERICK I. STEELE.
ADDISON O. WILLIS.

REFERENCES CITED

The following references are of record in the file of this patent:

UNITED STATES PATENTS

| Number | Name | Date |
|---|---|---|
| 2,194,890 | Seversky | Mar. 26, 1940 |
| 2,231,929 | Lyman | Feb. 18, 1941 |
| 2,387,762 | Leonard | Oct. 30, 1945 |

OTHER REFERENCES

"Aviation News" of Feb. 12, 1945, page 10.